United States Patent
Chiriotti et al.

(12) 
(10) Patent No.: US 6,495,788 B1
(45) Date of Patent: Dec. 17, 2002

(54) ELECTRODE FOR MACHINING A PIECE BY ELECTRO-EROSION AND ITS PROCESS FOR PRODUCTION

(75) Inventors: Nicolas Chiriotti, Geneva (CH); Roberto Perez Pinaya, Geneva (CH); René Fluekiger, Plan-les-Quates (CH)

(73) Assignee: Charmilles Technologies SA, Meyrin (CH)

( * ) Notice: Subject to any disclaimer, the term of this patent is extended or adjusted under 35 U.S.C. 154(b) by 63 days.

(21) Appl. No.: 09/716,938

(22) Filed: Nov. 22, 2000

(30) Foreign Application Priority Data

Dec. 9, 1999 (EP) .............................. 99124586

(51) Int. Cl.$^7$ ................................ B23H 1/00
(52) U.S. Cl. ................. 219/69.12; 219/69.15; 219/69.17; 148/240
(58) Field of Search ................ 219/69.12, 69.11, 219/69.15, 69.17; 148/240, 277

(56) References Cited

U.S. PATENT DOCUMENTS

| | | | | |
|---|---|---|---|---|
| 4,287,404 A | * | 9/1981 | Convers et al. .......... | 219/69 W |
| 4,341,939 A | * | 7/1982 | Brifford et al. .......... | 219/69 W |
| 4,837,416 A | * | 6/1989 | Yamamoto et al. ...... | 219/69.12 |
| 4,935,594 A | * | 6/1990 | Groos et al. ............. | 219/69.12 |
| 4,968,867 A | * | 11/1990 | Banzai et al. ............ | 219/69.12 |
| 5,118,572 A | * | 6/1992 | DeRobert et al. .......... | 428/607 |
| 5,231,270 A | * | 7/1993 | Groos et al. ............. | 219/69.12 |
| 5,808,262 A | * | 9/1998 | Mukherjee ............... | 219/69.12 |
| 5,966,975 A | * | 10/1999 | Lacourcelle ................... | 72/46 |

FOREIGN PATENT DOCUMENTS

| | | | |
|---|---|---|---|
| EP | 0800886 A1 | 10/1997 | |
| EP | 0955396 A1 | 11/1999 | |
| JP | 59129744 | 7/1984 | |
| JP | 64-78724 | * 3/1989 | ............ B23H/7/08 |

* cited by examiner

*Primary Examiner*—M. Alexandra Elve
(74) *Attorney, Agent, or Firm*—Young & Thompson

(57) ABSTRACT

A wire electrode for machining a piece by electro-erosion includes a metallic core and a cladding having an alloy of manganese and zinc obtained by simultaneous electrolytic deposition at a thickness between 1 and 40 micrometers. The cladding permits a substantial increase of the machining, particularly rough machining, performance, a considerable deformability of the wire, a high resistance to traction and stability of the cladding over time.

16 Claims, 2 Drawing Sheets

COMPARATIVE TABLE

| No | Wire | Speed without cladding | Speed with cladding ZnMn30 | Increase [%] |
|---|---|---|---|---|
| 1 | $CuZn_{37}$ | 1.00 | 1.32 | 32 |
| 2 | Cu+Zn | 0.94 | 1.07 | 14 |
| 3 | $CuZn_{37}$+Zn | 1.08 | 1.33 | 23 |
| 4 | $Cu(CuZn_{50})$ | 1.23 | 1.45 | 18 |

ELECTRODE FOR MACHINING A PIECE BY ELECTRO-EROSION AND ITS PROCESS FOR PRODUCTION

BACKGROUND OF THE INVENTION

The present invention relates to an electrode in the form of a wire or a rod for machining a piece by electro-erosion, comprising a metallic core and a cladding constituted by at least one other metal.

Such an electrode is described in the document JP 1-78724. It comprises a brass core and a cladding of pure manganese of a thickness of about 1 μm. This electrode permits obtaining precise finishing machining. During rough machining, the cladding is adapted to be completely eliminated from the surface of the wire and thus does not lead to improvement of the machining. When it is sought to obtain greater thicknesses of the manganese layer, the latter gives to the wire too great a rigidity and hardness, which gives rise to problems during production of the wire and prevents good drawing of the wire. Moreover, given that the manganese deposited by electrolysis is in a metastable phase, its surface condition degrades and its adherence to the core decreases with time.

SUMMARY OF THE INVENTION

The present invention has for its object to overcome these drawbacks, and the invention is characterized to this end by the fact that the cladding is constituted by at least one deposit of an alloy comprising manganese and at least one second metal selected from the group of metals comprising Zn, Co, Cu, Ag, Fe, Mo, Ni, Se, Sn, W, the deposit having a proportion of manganese comprised between 5 and 85% by weight and a thickness greater than 1 micrometer.

The second metal, in particular zinc, permits obtaining a wire whose external layer is much more easily deformable. There can thus be produced drawn wires whose external layer is several tens of micrometers in thickness. This layer is thus not eliminated during rough machining, but will permit a considerable increase of the rough machining quality. The wire obtained permits stabilizing the layer thus formed, which is accordingly no longer subject to degradation by the manganese with time. The invention also permits increasing the tensile strength of the covered wire because of the presence of manganese in the alloy. The electrode wires thus obtained can be stretched more greatly during machining and accordingly permit obtaining a better geometry on the cut piece and retard rupture of the wire while machining.

According to a preferred embodiment, the deposit is constituted by a binary alloy of manganese and zinc, the proportion of manganese being comprised between 5 and 85%, preferably between 10 and 60% and more preferably between 15 and 40% by weight.

This cladding alloy permits the particularly favorable characteristics of machining performance, deformability, resistance to traction and stability with time.

Preferably, the core has a concentric structure with the copper center and a peripheral layer of brass supporting said deposit.

These characteristics permit very high machining speeds.

The invention also relates to a process for the production of an electro-erosion electrode and is characterized to this end by the fact that a wire or rod forming said core is treated in an electrolytic bath arranged to produce a simultaneous deposition of manganese and at least one second metal selected from the group comprising Zn, Co, Cu, Ag, Fe, Mo, Ni, Se, Sn, W. This process by electrolytic co-deposition permits rapid and precise production at a moderate cost.

Preferably, the electrolytic bath is arranged so as to produce simultaneous deposition of manganese and zinc having a manganese proportion comprised between 5 and 85% by weight, the duration of treatment being determined so as to attain a layer by electrolytic deposit thicker than 1 micrometer.

Preferably, said electrolytic bath is an aqueous solution having the following composition:

monohydrated manganese sulfate in a concentration between 20 and 120 g/l, preferably 30 g/l;

hepta-hydrated zinc sulfate in a concentration between 50 and 80 g/l, preferably 65 g/l;

bi-hydrated sodium citrate in a concentration between 60 and 300 g/l, preferably 170 g/l.

With these characteristics there is obtained a very regular and stable cladding, whilst maintaining a moderate price.

Other advantages will become apparent from the characteristics set forth in the dependent claims and from the description of the invention given hereafter in greater detail with the help of drawings which show schematically and by way of example one embodiment.

DETAILED DESCRIPTION OF THE PREFERRED EMBODIMENTS

Figures 1, 2:
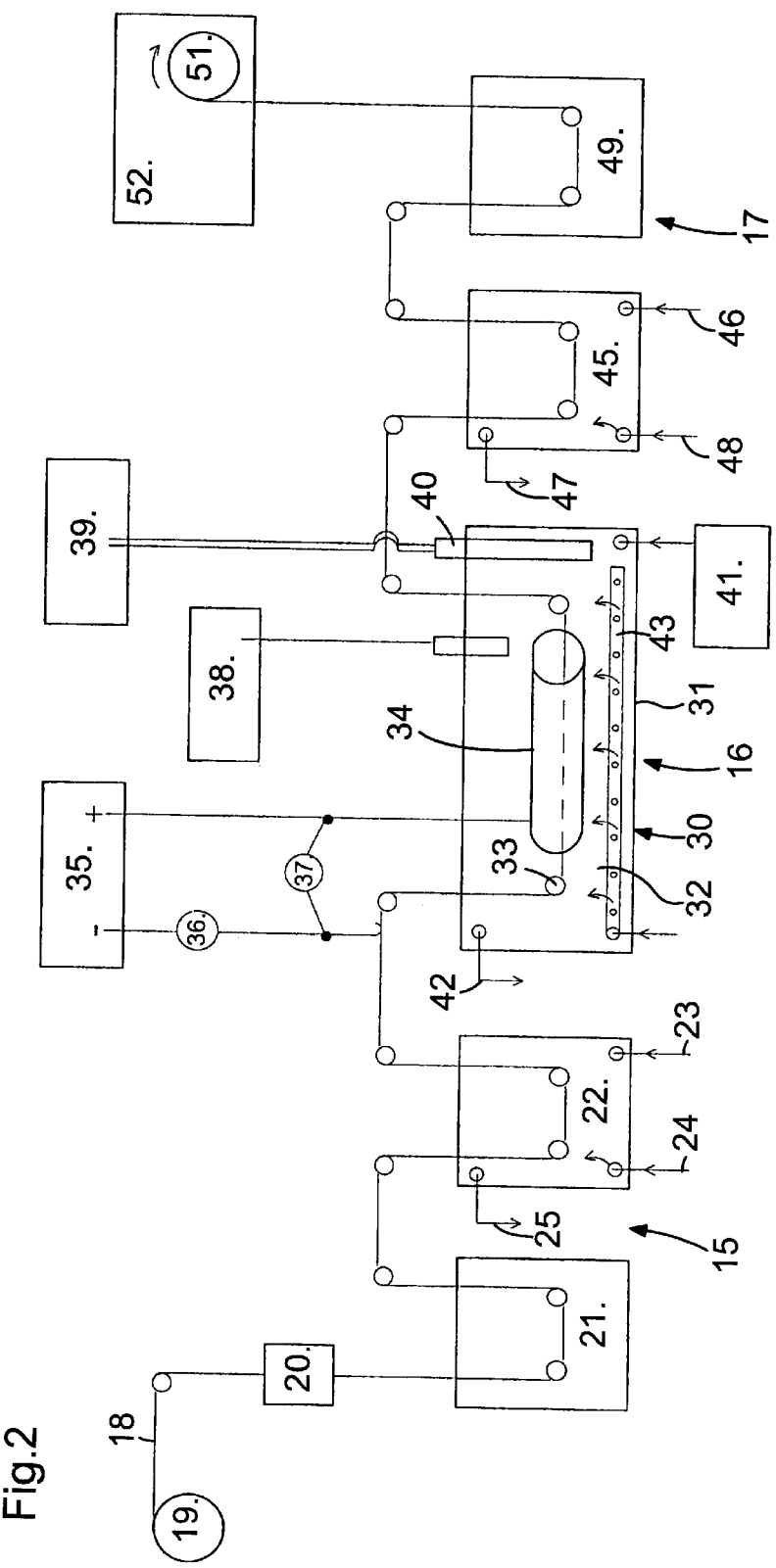
FIG. 1 shows a cross-section through an electrode according to the invention.
FIG. 2 shows an installation for practicing a process of production of this electrode.

The electrode according to one embodiment of the present invention is present in the form of a wire for cutting a metal piece by spark erosion or electrical erosion, as illustrated in FIG. 1. This wire comprises a metallic core 10 and a cladding 11 constituted by an electrolytic deposit of an alloy.

The metallic core can for example be constituted by brass, by copper, by an alloy of copper and manganese, or by iron. Moreover, this core can be covered with a layer of zinc supporting the cladding 11. The zinc layer would thus typically have a thickness of several micrometers, for example 5 μm. The core 10 can also have a concentric structure with a copper center and a peripheral layer of brass. This core is obtained by covering a copper center with a layer of zinc and carrying out a thermal treatment to obtain a thermal diffusion such that there results a copper center and a surface layer of brass.

The cladding 11 is constituted by an electrolytic deposit of a binary alloy of manganese and zinc obtained by co-deposition in a simultaneous electrolytic deposition. The proportion of manganese in the obtained alloy is comprised between 5 and 85%, preferably between 10 and 60% and more preferably between 15 and 40% by weight. The zinc could also be replaced partially or entirely by other metals as will be described later.

A portion of substantially 20% by weight of manganese in this binary alloy is very favorable because of the facility of electrolytic deposition, of the deformability of the wire obtained, and above all the excellent performance of electro-erosion.

The cladding 11 of ZnMn alloy permits obtaining increases in the speed of electromachining, typically comprised between 14% and 32% according to the core 10 of the wire. These machining performances depend of course also on the constitution of this core.

Figures 3, 4:
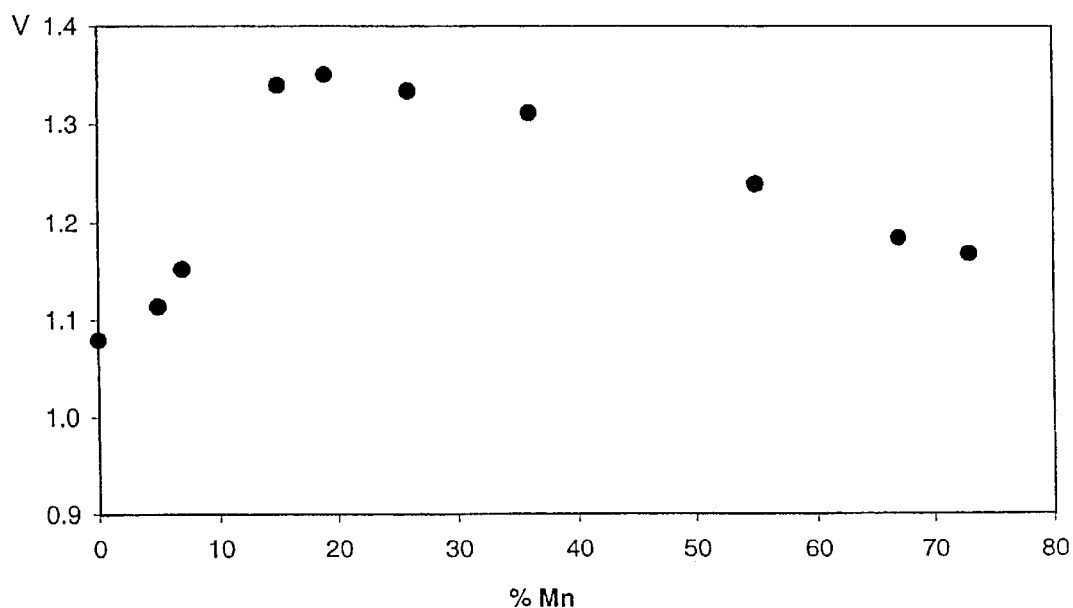
FIG. 3 shows a table comparing the speeds of machining standardized for roughing.
FIG. 4 is a diagram showing the speed of standardized machining for roughing as a function of the concentration in weight percent of manganese in the ZnMn alloy.

The table of FIG. 3 shows comparative measurements of the speed of rough cutting in steel.

The speeds are standardized relative to a standard glass wire $CuZn_{37}$ of a diameter of 0.25 mm, for which the speed is fixed at 1.00.

In the first column are given the numbers of the experiment. The second column indicates the wire or core of the wire used, which are:

in experiment 1, brass $CuZn_{37}$,
in experiment 2, copper with a layer of 5 $\mu$m of Zn,
in experiment 3, brass $CuZn_{37}$ with a layer of 5 $\mu$m of Zn, and
in experiment 4, copper with a surface layer of $CuZn_{50}$ brass obtained by thermal diffusion between the copper and a zinc layer.

It is to be noted that wire No. 4 Cu ($CuZn_{50}$) was, before the present invention, the best wire available. The deposit of a layer of pure zinc of 5 $\mu$m on this core, followed by drawing to 0.25 mm, did not give any increase in the speed of rough cutting, contrary to the deposition of a layer of binary zinc-manganese alloy.

In columns 3 and 4, respectively, are shown the speeds of rough cutting standardized without a cladding according to the present invention, respectively with a cladding of $ZnMn_{30}$ of a thickness of 5 $\mu$m.

All the wires are drawn to a standard diameter of 0.25 mm.

In the last column are given the values of increase of speed in percent obtained by the cladding of a $ZnMn_{30}$ alloy according to the present invention. This concentration of $ZnMn_{30}$ was selected indicatively, but does not necessarily represent the optimum concentration from a point of view of performance.

These comparative measurements show that the best performances are obtained with a core of wire No. 4 covered with a cladding of binary ZnMn alloy.

The greatest increase in speed, 32%, is obtained with a wire core of $CuZn_{37}$ brass.

Relative to the wire described in JP 1-78724, which is comprised of a core covered with a layer Mn of a maximum thickness of 1 $\mu$m, the cladding obtained by simultaneous deposition of zinc and manganese according to the present invention permits obtaining a wire whose external layer is much more easily formable. Wires can thus be produced and drawn whose external layer of ZnMn is much thicker than 1 $\mu$m, up to several tens of micrometers in thickness, for example 2 to 40 $\mu$m, preferably 3 to 15 $\mu$m. Moreover, the concentrations of zinc and manganese in the alloy of cladding 11 can be varied as a function of the desired properties.

These advantages were not possible with the wire described in the mentioned Japanese document, because manganese is a material of great hardness. The deposit of a thicker layer than 1 micrometer gives rise to problems during deformation, in particular during drawing.

Moreover, pure manganese deposited on the outside of the core of a wire, such as described in the Japanese document, is principally a metal in a metastable phase. Its quality thus changes with time, its surface condition degrades and its adherence to the core decreases. These drawbacks are eliminated by the present invention, because the presence of zinc deposited simultaneously with manganese permits stabilizing the alloy thus formed, which is accordingly not subject to degradation suffered by pure manganese in the course of time.

The present invention is principally adapted to machining with a cladding 11 of a thickness greater than 1 $\mu$m, particularly useful during rough machining. On the contrary, the manganese cladding of the mentioned Japanese document was developed to carry out finishing machining with a fine layer of about 1 micron of manganese. This layer can thus resist fine machining, but is however destroyed and eliminated during rough machining. The layer of manganese described in the Japanese document therefore cannot be used in rough machining.

Relative to conventional wires, the ZnMn alloy cladding permits significantly increasing the tensile strength of the wire. Wires according to the present invention thus could be stretched more strongly during machining and will accordingly permit obtaining better geometry of the cutout piece and retard the rupture of the wire during machining.

The standardized speeds of machining relative to a standard brass wire $CuZn_{37}$ of a diameter of 0.25 mm, for which the speed is fixed at 1.00, have been experimentally determined for wires having a core 10 of $CuZn_{37}$ brass with a cladding 11 of ZnMn comprising different concentrations of manganese. The results are given in the diagram of FIG. 4, showing the speeds of standardized rough machining V as a function of the concentration of manganese by weight percent. There will be noted a maximum value of about 20% manganese, an optimum region between 15% and 40%, a very favorable region between 10% and 60% and a region that is still advantageous between 5% and 85%.

It is also to be noted that the cladding without manganese or claddings with very high contents of manganese, give rise to slower machining speeds and that there exists an optimum value of about 20% of manganese. Such a result is entirely surprising and unforeseeable, but permits undeniable technical progress.

According to a modification, one or several other metals selected from the group of metals comprising Cu, Ag, Ni, Co, could be added to the base ZnMn alloy according to predetermined concentrations that are evaluated experimentally.

According to other modifications, the zinc of cladding 11 could be replaced by one or several substitution metals selected from the group of metals comprising Co, Cu, Ag, Fe, Mo, Ni, Se, Sn, W.

The process of production of the wire according to the invention is described hereafter with reference to FIG. 2. This process comprises pretreatments 15 of the wire forming the core 10, the deposition 16 of the cladding 11 of ZnMn alloy and post-treatments 17.

The wire 18 constituting the core 10 is unrolled from a supply spool 19 to arrive at the pretreatment zone 15, which pretreatments are necessary for preparation of the surface of the core 10 before carrying out electrolytic co-deposition of the ZnMn alloy. The first pretreatment consists in degreasing the surface of the wire in a degreasing cell 20 with solvents, such as acetone, methylene chloride, etc. This degreasing is followed with acid attack in an acid bath 21 to remove oxidized formations. For copper or copper alloy wires, there is preferably used a sulfuric acid solution at ambient temperature.

The concentration of the acid solution is comprised between 5 and 30% by weight and preferably 20% by weight. If it is desired to accelerate the deoxidation process, the bath is heated to 80° C. As a function of the concentration and of the temperature, the attack time can vary between 1 and 10 minutes. The pretreatment is finished by rinsing in a vat 22 comprising a water supply 23, and agitation air conduit 24 and water alloy 25.

The deposition of the ZnMn alloy takes place by codeposition in an electrolysis installation 30 comprising a vat 31, for example of Pyrex glass of a diameter of 100 mm containing the electrolysis solution or the electrolyte 32. The pulleys 33 supporting the wire in the bath are preferably of Teflon®.

An anode 34 is suspended in the vat 31 and is constituted of zinc or stainless steel, or else titanium or niobium with a platinum cladding. For example, the anode can be formed by a pure zinc wire wound to obtain a winding of a diameter of 20 mm, through which passes the wire 18 constituting the cathode. An adjustable DC generator 35 is connected to the wire and to the anode.

An ammeter 36 and a voltmeter 37 permit measuring the current of the voltage. The installation moreover comprises an instrument 38 for measuring pH of the solution and a control element 39 for the temperature with a heating element 40.

An electrolyte supply 41 permits renewing the solution in the vat 31 which comprises an outlet conduit 42 for the electrolyte. Agitation of the bath is ensured by a nozzle 43 of nickeled copper, by which is injected nitrogen or air.

The electrolyte 32 is an aqueous solution with the following composition:

monohydrated manganese sulfate, in concentrations comprised between 20 and 120 g/l, preferably 30 g/l, hepta-hydrated zinc sulfate, in concentrations comprised between 15 and 80 g/l, preferably 65 g/l, bi-hydrated sodium citrate, in concentrations comprised between 60 and 300 g/l, preferably 170 g/l.

The bath temperature is maintained between 20 and 60° C. High temperatures increase the stability of the bath and permit decreasing the renewal flow of the solution.

Under given conditions, the concentration of manganese of the deposition decreases when the bath temperature is increased; it is therefore necessary to readjust in this case the other conditions of deposition so as to obtain the desired composition.

The pH of the solution can be fixed between 3.5 and 6. It can be adjusted with sulfuric acid solutions and sodium hydroxide solutions. A greater pH than 5.4 promotes stability of the bath. By decreasing the pH of the solution, the concentration of Mn of the deposition is decreased under given conditions.

The current density can be varied between 2 and 50 A/dm$^2$, and can for example be fixed at 10 A/dm$^2$. The Mn concentration in the deposition increases with the current density used. For high currents, the current efficiency to produce the deposition decreases. To obtain a given thickness, it is therefore necessary, if the current density is increased, to adjust other parameters, for example the duration of deposition.

The variables of deposition current density, of pH of the solution, of temperature, of speed of flow of renewing solution, are fixed as a function of the desired composition of the alloy.

The speed of passage of the wire through the bath defines the deposition time and the final thickness of the deposit. The deposition time can also be optimized as a function of the speed of renewal of the solution. By increasing this speed, the current efficiency is increased, but the concentration of Mn in the deposit is decreased.

The wire thus obtained then passes to the post-treatments, which can comprise a series of operations, beginning with rinsing in a water bath carried out in a vat 45 with an inlet conduit 46, an outlet conduit 47 and an agitating air supply 48. There can also be carried out an acid treatment in a dilute nitric acid solution of 0.25–0.5% contained in a similar vat. There then can follow a series of post-treatments 49, such as passivation, thermal treatment, wire drawing and surface treatments.

Passivations of the surface of the cladding of the wires are desirable if it is sought to reinforce their resistance against wear or corrosion in different media. Passivation processes that can be used in the present case are chromization and phosphatation.

For chromization, an economical and effective method consists in using, for example, aqueous solutions comprising 3 g/l of chromic acid and 5 g/l of sodium chloride. Immersion of the wire in this bath for 5 to 30 seconds is sufficient to form, on the surface of the claddings, a very thin protective film, containing hexavalent and trivalent chromium, as well as oxides of the base materials. This treatment is followed with hot air drying before final winding. In case the wire must be reduced in diameter by wire drawing, this must be carried out after chromization.

Phosphatation has advantages both for protection against corrosion and for cold deformation of the wire. This process can therefore be carried out before wire drawing. It could take place, for example, by immersion of the wire in a phosphoric acid solution. This treatment produces a thin layer of phosphates of the base material of the cladding at the surface of the latter. These compounds render less active the surface of the cladding and serve, because of their structure as platelets, fibers or other oriented shapes, as lubricants to facilitate wire drawing.

The possible thermal treatments take place preferably after passivation and the device can for this purpose consist in an oven permitting carrying out temperature levels. This device can also take the form of two contacts spaced by a certain distance and permitting making an electric current flow in the wire to heat it by the Joule effect. The thermal treatments permit diffusing the metal deposited at the surface of the wire.

The diameter of the wire 18 is reduced in a wire drawing device comprising one or several wire dies down to the final diameter to be obtained.

The surface treatments take place before or after wire drawing and can for example comprise superficial oxidation carried out in a heating device containing an atmosphere rich in oxygen and/or an anodization of the surface.

By means of anodization, oxide layers can be formed on the deposits on the wires. The process of anodization can be carried out in an electrolysis device with a wire to be oxidized used as the anode. In this case, the electrolyte is constituted by an oxalic acid solution, in concentrations between 50 and 100 g/l, preferably 75 g/l.

Materials for the cathode can be aluminum, stainless steel or graphite. The process takes place at ambient temperature.

The thickness of the layer depends on the voltage applied between the anode and cathode. The latter depends in turn on the surface conditions of the deposit. If the latter has been passivated by phosphatation or chromization or preliminarily oxidized by thermal or chemical treatments, the voltages necessary to obtain a given thickness are greater than if the deposit has not been treated, because of the increased resistance of the surface to the preliminary treatment. For these types of anodization, there can be used voltages between 5 and 60 V. For untreated wires, this voltage is between 0.1 and 3 V.

As a function of the speed of passage of the wire, there are obtained different anodization currents and different characteristics for the anodic oxides. This speed can be adjusted so as to carry out anodization during a time between 1 and 30 seconds. Anodization times of the order of 2–5 seconds are preferably used. These conditions produce mean currents between 10 and 200 mA/cm$^2$. The thicknesses of the anodic oxides obtained are typically between 0.1 and 2 μm.

After the different post-treatment operations, the wire is wound after degreasing on a receiving spool 51 with a speed controlled by a control drive device 52. In a preferred embodiment, the final thickness of the cladding 11 of ZnMn alloy is typically 8 μm.

Of course the embodiment described above is not limiting in nature and can be the subject of all desirable modifications within the scope defined by claim 1. In particular, the electrode could have another shape than a wire, for example the shape of a rod adapted for use in an installation for electro-erosion by immersion.

The core 10 of the electrode could have another composition than indicated above, for example of iron or iron alloy. This core 10 of the electrode could itself be constituted by several superposed layers, for example Fe, Cu, Zn.

The cladding 11 could also have two or more deposits of zinc-manganese of identical or different composition. The deposits could be separated by intermediate layers or be in direct contact. The cladding 11 could also be provided with an external peripheral layer, for example of zinc or tin.

The characteristics of the production installation could be adapted to electrodes having another shape or another composition of cladding. Thus, the composition of the electrolytic solution could be modified to produce claddings 11 comprising an alloy of manganese with another second metal selected from the group of metals comprising Co, Cu, Ag, Fe, Mo, Ni, Se, Sn, W.

The composition of the electrolytic solution could also be selected so as to carry out a zinc and manganese coating containing a predetermined concentration of one or several other metals selected from the group of metals comprising Cu, Ag, Sn, Ni, Co.

The physico-chemical conditions of the electrolytic bath could be suitable for the more or less rapid formation of a layer of alloy.

The production process for the cladding 11 could also be of a different type, for example by forming successive superposed layers of zinc and manganese in separate electrolytic baths and then subjecting the electrode to a thermal treatment, thereby to produce a layer of ZnMn by thermal diffusion.

Instead of depositing the cladding by a galvanization process, other types of simultaneous or successive depositions could be envisaged, such as depositions in simultaneous or successive gaseous phase with suitable thermal treatment.

What is claimed is:

1. Electrode in the form of a wire or rod for machining a piece by electro-erosion, comprising a metallic core (10) and a cladding (11) constituted by at least one other metal, characterized by the fact that the cladding (11) is constituted by at least one deposition of an alloy comprising manganese and at least one second metal selected from the group of metals comprising Zn, Co, Cu, Ag, Fe, Mo, Ni, Se, Sn, W, the deposition having a proportion of manganese comprised between 5 and 85% by weight and a thickness greater than 1 micrometer.

2. The electrode according to claim 1, wherein the deposition is constituted by a binary alloy of manganese and zinc, the proportion of manganese being comprised between 10 and 60% by weight.

3. Electrode according to claim 1, characterized by the fact that said deposition is an electrolytic deposition.

4. Electrode according to claim 2, characterized by the fact that the deposition is constituted of a manganese and zinc alloy containing a predetermined concentration of one or several other metals selected from the group of metals comprising Cu, Ag, Sn, Ni, Co.

5. The electrode according to claim 1, wherein the core has a concentric structure with a copper center and a peripheral layer of brass supporting said deposition.

6. The electrode according to claim 1, wherein the core comprises at least one of brass, copper, a copper and manganese alloy, and iron.

7. The electrode according to claim 5, further comprising a layer of zinc supporting said alloyed deposition and covering the core.

8. The electrode according to claim 1, wherein said thickness is between 2 and 40 micrometers.

9. A process for producing an electrode in the form of a wire or rod having a metallic core and a cladding having an alloy comprising manganese and at least one metal selected from Zn, Co, Cu, Ag, Fe, Mo, Ni, Se, Sn, and W, the cladding having a thickness of greater than 1 micrometer and a proportion of manganese between 5 and 85% by weight, said process comprising the steps of:

treating the rod or wire in an electrolytic bath so as to form the metallic core, the electrolytic bath being arranged so as to produce a simultaneous deposition of zinc and at least one second metal selected from the group comprising Zn, Co, Cu, Ag, Fe, Mo, Ni, Se, Sn, and W.

10. The process according to claim 9, wherein said electrolytic bath treating step, the electrolytic bath is arranged to produce a simultaneous deposition of manganese and zinc having a proportion of manganese comprised between 5 and 85% by weight, the duration of treatment being predetermined so as to obtain a layer of electrolytic deposit greater than 1 micrometer.

11. The process according to claim 10, wherein the electrolytic bath is an aqueous solution having the following composition:

mono-hydrated manganese sulfate, in concentrations between 20 and 120 g/l, hepta-hydrated zinc sulfate, in concentrations between 50 and 80 g/l, bi-hydrated sodium citrate, in concentrations between 60 and 300 g/l.

12. The process according to claim 9, wherein before the electrolytic bath treating step, the electrode is pretreated by the steps of:

degreasing a surface of the electrode with solvents; and carrying out an acid attack to remove oxide formations.

13. The process according to claim 9, further comprising at least one of the following steps for post-treating the electrode:

immersing the electrode in dilute acid solution, passivating the electrode by chromatization or by phosphatation, wire drawing the electrode, thermal treating the electrode, surface treating the electrode, and depositing a supplemental peripheral layer on the electrode.

14. The electrode according to claim 2, wherein the proportion of manganese is between 15 and 40% by weight.

15. The electrode according to claim 8, wherein the thickness is between 3 and 15 micrometers.

16. A process according to claim 11, wherein the electrolytic bath comprises 30 g/l of mono-hydrated manganese sulphate, 65 g/l of hepta-hydrated zinc sulfate, and 170 g/l of bi-hydrated sodium citrate.

* * * * *